(12) United States Patent
Miyazaki

(10) Patent No.: US 11,602,799 B2
(45) Date of Patent: Mar. 14, 2023

(54) CLEANING PAD ASSEMBLY

(71) Applicant: Hakko Corporation, Osaka (JP)

(72) Inventor: Mitsuhiko Miyazaki, Osaka (JP)

(73) Assignee: Hakko Corp

( * ) Notice: Subject to any disclaimer, the term of this patent is extended or adjusted under 35 U.S.C. 154(b) by 0 days.

(21) Appl. No.: 16/807,510

(22) Filed: Mar. 3, 2020

(65) Prior Publication Data
US 2020/0198039 A1 Jun. 25, 2020

Related U.S. Application Data

(62) Division of application No. 15/667,888, filed on Aug. 3, 2017, now abandoned.

(30) Foreign Application Priority Data

Aug. 8, 2016 (JP) .................................. 2016-155780
Jan. 11, 2017 (JP) .................................. 2017-002301

(51) Int. Cl.
*B23K 3/02* (2006.01)
*B23K 3/08* (2006.01)
*B23K 3/04* (2006.01)
*B08B 1/00* (2006.01)
*B23K 1/018* (2006.01)
*B08B 7/00* (2006.01)

(52) U.S. Cl.
CPC .............. *B23K 3/029* (2013.01); *B08B 1/005* (2013.01); *B23K 1/018* (2013.01); *B23K 3/08* (2013.01); *B08B 7/00* (2013.01); *B23K 3/04* (2013.01)

(58) Field of Classification Search
CPC ........... A46B 17/06; A46B 3/22; A46B 9/005; A46B 2200/3073; A46B 2200/40; B08B 1/002; B08B 1/005; B23K 3/08; B23K 1/018; B23K 3/028; A46D 1/0253; A46D 1/0269; A46D 1/02; A47L 23/266; A47L 25/00
USPC .......... 15/423, 104.001, 142, 186, 187, 188, 15/236.05, 236.06, 236.08, 236.09, 215
See application file for complete search history.

(56) References Cited

U.S. PATENT DOCUMENTS

| | | | | |
|---|---|---|---|---|
| 6,108,854 A | * | 8/2000 | Dingert | A46B 9/02 15/188 |
| 7,310,849 B2 | * | 12/2007 | White | A45D 20/525 15/176.4 |
| 8,595,887 B2 | * | 12/2013 | Hiltmann | A01K 13/002 15/186 |
| D882,176 S | * | 4/2020 | Huang | D28/63 |
| 2012/0028554 A1 | * | 2/2012 | Weinberger | A47L 17/06 15/236.01 |

(Continued)

FOREIGN PATENT DOCUMENTS

| | | |
|---|---|---|
| CN | 2719469 | 8/2005 |
| JP | 1978143824 | 11/1980 |

*Primary Examiner* — Monica S Carter
*Assistant Examiner* — Alberto Saenz
(74) *Attorney, Agent, or Firm* — David B Abel

(57) ABSTRACT

The invention details the designs of cleaning pad assemblies for use with heating tools including for example soldering cartridges and soldering irons. The cleaning pads of the assembly are designed to effectively remove and clean the solder from heating tools during and at the end of soldering operations, and allow the collection of the removed solder.

13 Claims, 20 Drawing Sheets

(56) References Cited

U.S. PATENT DOCUMENTS

2015/0013726 A1* 1/2015 Webster ................ A46B 17/06
15/257.01
2017/0303677 A1* 10/2017 Xavier .................... A46B 9/02

* cited by examiner

CLEANING PAD ASSEMBLY

Related U.S. Application Data: Divisional application of U.S. application Ser. No. 15/667,888 filed Aug. 3, 2017, for Cleaning Pad Assembly.

FIELD OF THE INVENTION

The present invention relates to a cleaning pad assemblies and cleaning pads to remove bonding materials such as solder from a heating tool, such as a soldering tip of a soldering cartridge or soldering iron.

RELATED ART

There are some known ways to remove bonding material from heating tools such as a soldering iron and a tweezers. A user often uses a sponge containing water, and brushes the tip of the soldering iron across the sponge. However when the user uses the sponge to clean the heating tool, it promotes the oxidation of the heating tool and thus shortens the life of the tool. Alternatively, a user may use brass strip or brass brush to clean the tool. However, removing the solder from the brass strip or brass brush is difficult and the user may simply discard the brass strip or brass brush and solder instead of recycling the materials.

BRIEF DESCRIPTION OF THE INVENTION

The present invention provides designs and configurations of a new type of cleaning pad to remove solder efficiently, and allow the removed solder to be extracted and recycled. The designs of the present invention include a base and a plurality of upwardly extending projections extending from the base. The projections may have a number of different design configurations, as disclosed in the appended figures and described below. In addition, the projections may form a variety of patterns when viewed from above, as also disclosed in the appended figures and described below. The cleaning pad may be contained within a housing that allows easy placement and access by the user.

DETAILED DESCRIPTION OF THE INVENTION

Figure 1:
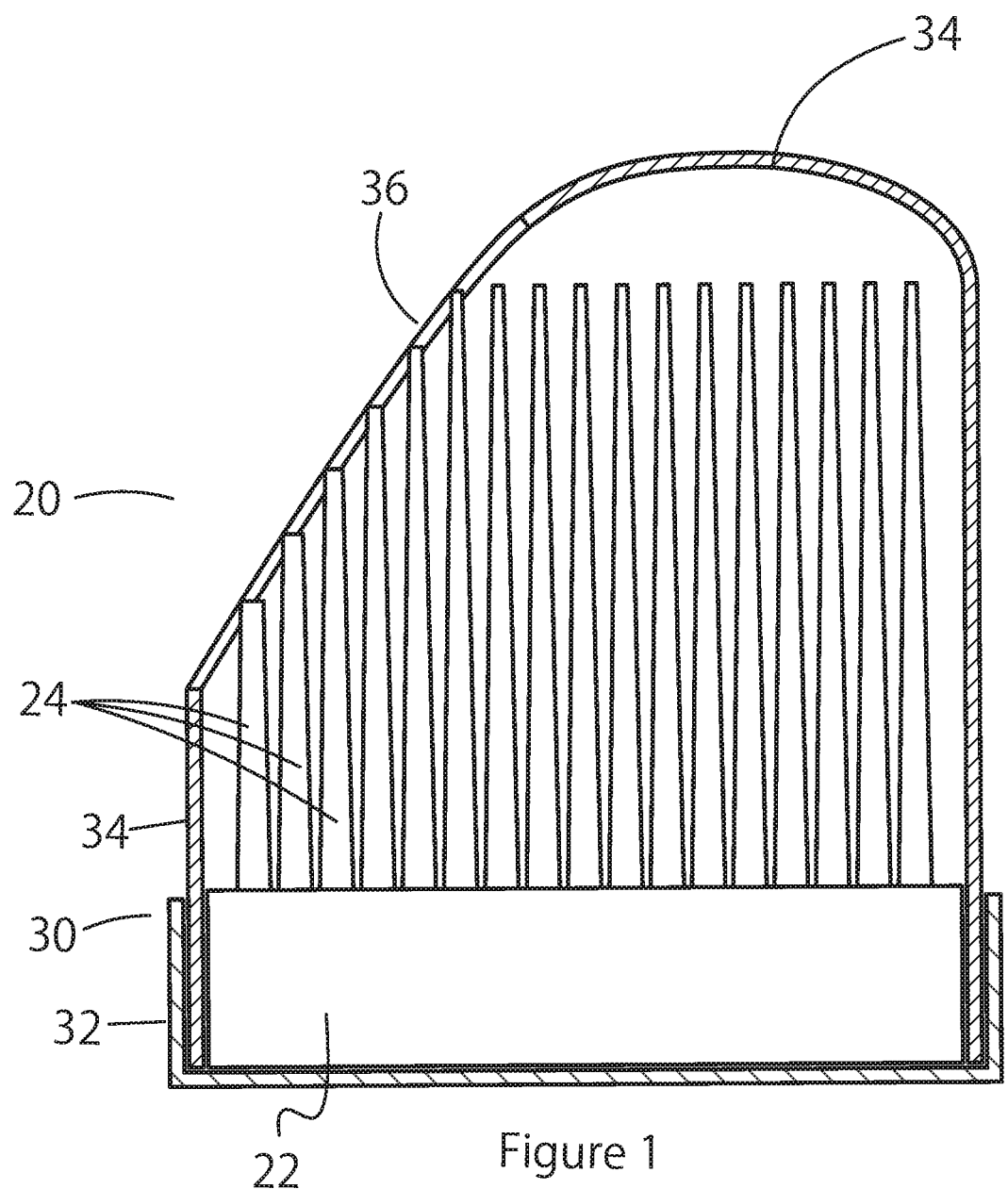
FIG. 1 is a side view of a cleaning pad and a partial cross sectional view of an enclosure for the cleaning pad according to the present invention.

FIG. 1 depicts a side view of an exemplary configuration of the cleaning pad 20. The cleaning pad 20 includes a base 22 and a plurality of projections 24 extending upward from the base 22. The cleaning pad 20 is depicted within a cross sectional view of a case or enclosure 30. The enclosure 30 may include a bottom section 32 and a removable dome 34. The dome 34 may include an opening 36 allowing a user to insert the tool being cleaned through the opening 36 to clean the tool on the projections 24. Because the projections 24 may be resiliently bendable, the dome 34 helps assure that solder being removed from the tool is not splashed or sprayed onto the work environment or the user. The dome 34 is configured to be removable from the bottom section 32, to allow the cleaning pad 20 to be removed and cleaned or replaced.

The heating tool may be a soldering iron, soldering cartridge, heated tweezers and other types of heating tool products for soldering and de-soldering operations. The solder may comprise many types of soldering materials, leaded and unleaded solder, silver solder and the like. In addition, the invention may be used with other types of heated bonding materials, not just solder. To clean the tip end of the heating tool (the tip of the soldering iron), the tip may be inserted through the top of the opening 36 above the projections 24, then moved down toward the base 22 and drawn back out toward the opening 36 so that solder is removed from the tip by the projections 24. Because of the plurality of projections 24, the user can insert the tip into the cleaning pad 20 to remove the excess solder without aiming carefully.

Figure 2:
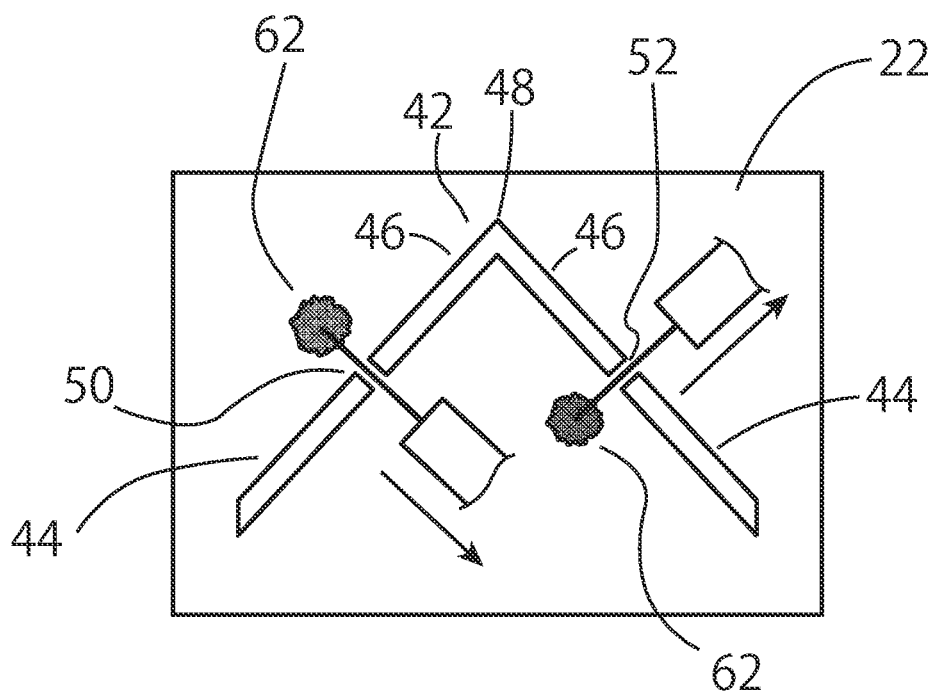
FIG. 2 is a top, partial view of the cleaning pad showing the design of a group of three projections.
Figure 3:
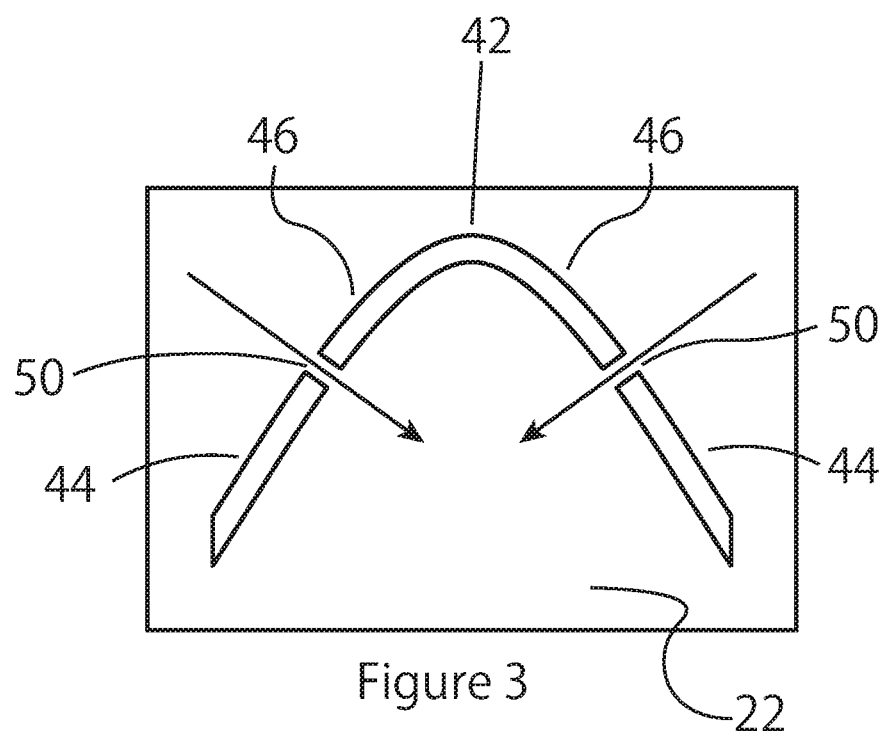
FIG. 3 is a top, partial view of the cleaning pad showing the design of a group of three projections having a first alternative configuration.

The cleaning pad 20 includes a plurality of projections 24, having a variety of configurations. FIG. 2 depicts a top view of a first exemplary configuration of a group of three projections 24. It should be appreciated that the cleaning pad may include a multitude of these groups of projections, and that the set of three is depicted for purposes of providing simplified detail of a representative grouping and depicting how the tool is cleaned. The group includes a center projection 42 and two linear end projections 44. The center projection 42 is depicted in FIG. 2 as having two sides 46 joined at a right angle 48, although the two sides may form an acute angle or an obtuse angle. Alternatively the center projection 42 may be curved or arcuate as shown in FIG. 3. The projections 42 and 44 project up from the base 22. Gaps 50 are formed between the edges of center projection 42 and the facing edge of the end projections 44, whereby the one gap 50 opens or faces toward a first direction and the other gap 52 opens or faces toward a second direction which is different from the first direction. Any or all of the center projection 42 and two end projections 44 may be bendable, and they may be configured to taper as they project and extend up from the base 22, so that the gaps 50 may become wider at the top of the projections 42 and 44.

FIG. 2 also provides a simplified exemplary depiction of a soldering iron tip 60 with a mass of solder 62, and how to remove the solder 62 from the soldering iron tip 60 using the projections 42 and 44. The tip end of the soldering tool is inserted at the top of the projections and then the soldering iron tip 60 is moved down into one of the gaps 50. The soldering iron tip 60 is then drawn back away from the projections 42 and 44. The solder 62 can be caught by the bending of the center projection 42 and the end projection 44. The projections 42 and 44 preferably provide elastic deformation so that they avoid imposing a heavy load to the soldering iron tip 60.

Figure 4:
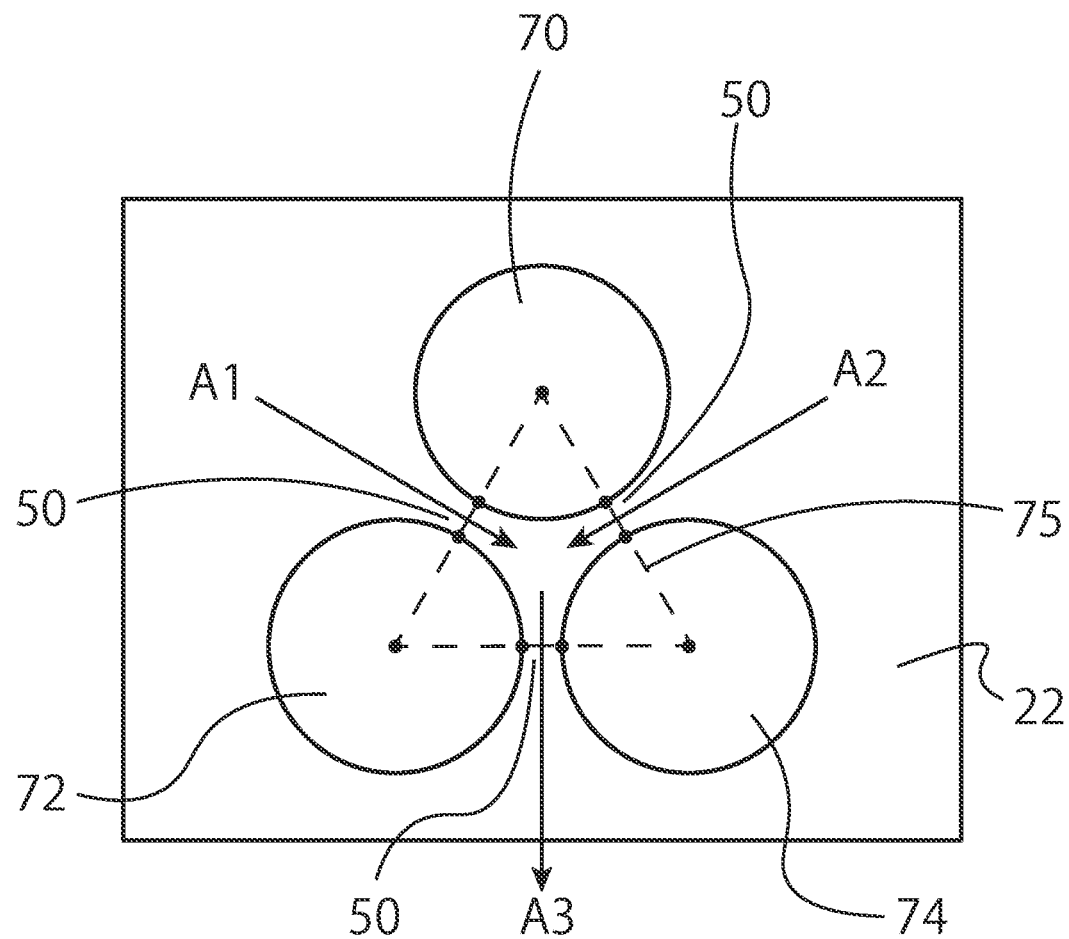
FIG. 4 is a top, partial view of the cleaning pad showing the design of a group of three projections having a second alternative configuration.

FIG. 4 depicts a top view of another alternative group of three projections 24, which may be formed projecting up from the base 22. As shown in FIG. 4, the three projections 24 of the group may be plural columns. The columns include a first column 70, a second column 72 and a third column 74. Each of the columns may be cylindrical, having a constant diameter, or conical, having a decreasing diameter. The outer peripheral surfaces of the first column 70, the second column 72 and the third column 74 define gaps 50 at their respective closest positions defined by an imaginary triangle 75 with corners at the central axis of the columns. A soldering iron tip may be inserted in the gaps 50 on either side of column 70 as shown by the arrows A1 and A2, and by the resilient bending of the columns the soldering iron tip may extend into the third gap 50 between columns 72 and 74, as shown by arrow A3. By inserting and removing the soldering iron tip between the peripheral surfaces of the columns 70, 72 and 74, the solder may be cleaned from our wiped off the tip. As in the above description, the columns 70, 72 and 74 preferably provide elastic deformation so that they avoid imposing a heavy load to the soldering iron tip. After the solder has been removed from the soldering iron tip, it solidifies and adheres to or sloughs off the columns 70, 72 and 74. Any solder that adheres to the columns 70, 72 and 74 may be released by physically deforming the columns to cause the solder to slough off. The cleaning pad 20 may then simply be inverted to recycle the solder.

Figure 5:
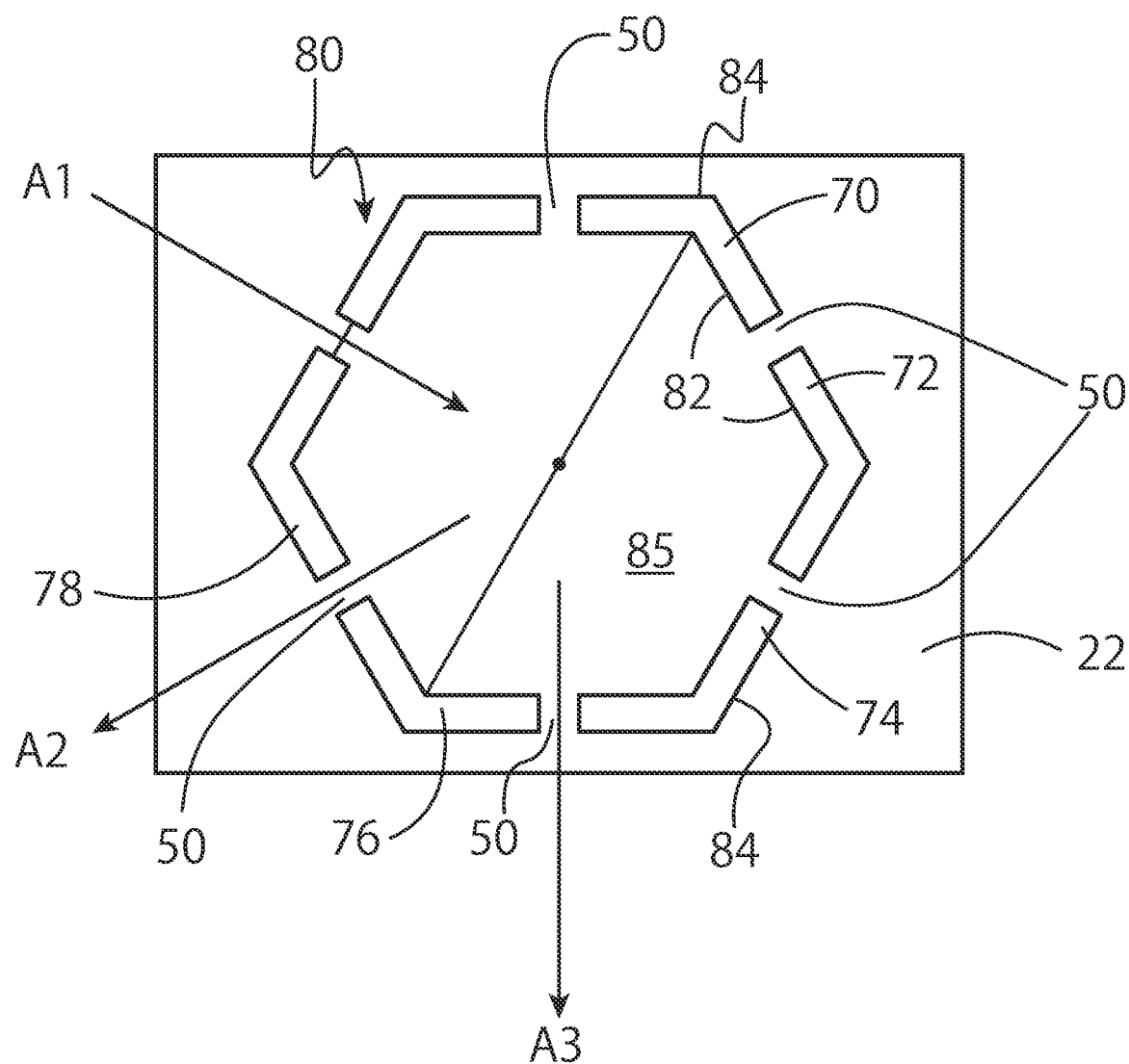
FIG. 5 is a top, partial view of the cleaning pad showing the design of a group of six projections having a third alternative configuration.

Alternate configurations of the columns may provide larger storage spaces for the removed solder. This prevents solder from scattering around. FIG. 5 depicts another alternate configuration of a group of projections 24. As shown in FIG. 5, six projections 70, 72, 74, 76, 78 and 80, configured so as to form the angled corners have a hexagon, each have a first inner surface 82 and a second outer surface 84. Gaps 50 are formed at the mid-point of each side of the hexagon to allow insertion of the soldering iron tip to be cleaned. The first inner surfaces 82 of the respective six projections 70-80 define a hexagonal open space 85 for collecting removed solder. Each of the six projections 70, 72, 74, 76, 78 and 80 is configured to be resiliently bendable so that they may be deformed when the soldering iron tip is inserted into or pulled through one of the gaps 50. By way of example, to clean a soldering iron tip having a diameter of 1 mm or less, the gaps 50 may have a dimension in the range of 0.1 mm to 1.5 mm. The six projections 70, 72, 74, 76, 78 and 80 may have constant dimensions from their respective points of contact with the base 22 to their tops surfaces, or they may taper toward the top surfaces to increases the size of the gaps 50.

Figure 6:
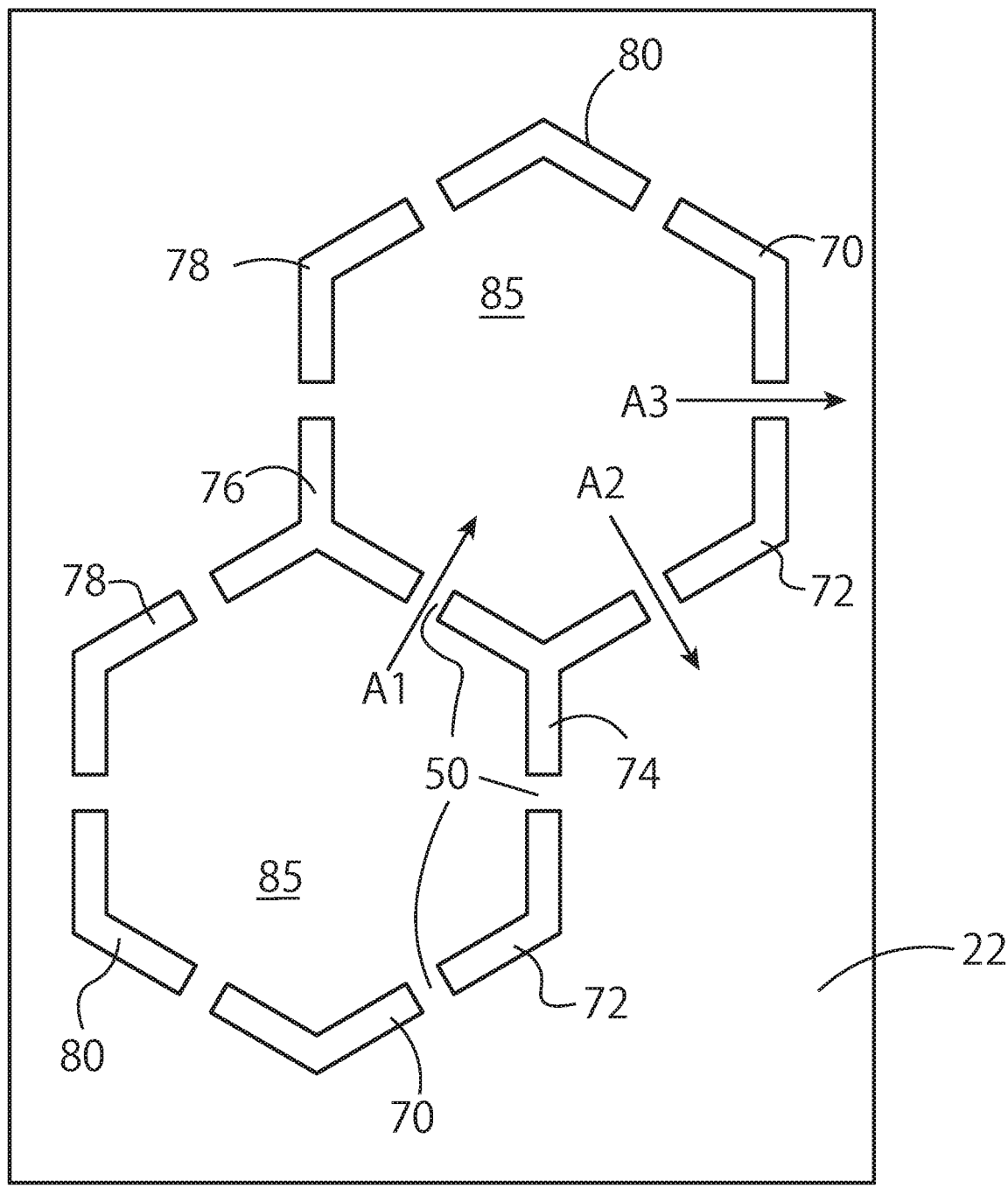
FIG. 6 is a top, partial view of the cleaning pad showing the design of two groups of six projections having a fourth alternative configuration.

FIG. 6 depicts another top view of an alternate configuration of a group of projections 24. In FIG. 6, the hexagonal shape of FIG. 5 is expanded to incorporate an adjacent hexagonal shape whereby one of the sides of the hexagon is shared between the two adjacent hexagons. Thus, by way of example, the projections 74 and 76 are "Y" shaped and the gap 50 is open and joins the open spaces 85 of each of the respective hexagons. As shown in FIG. 6, the six projections 70-80 of the first hexagon group and the respective projections 70-80 of the second hexagon group define the open spaces 85 to gather the removed solder. The gap 50 permits the movement of the soldering iron tip between the open spaces 85, so that the soldering iron tip can move linearly continuously passing through the first storage space and the second storage space along the line depicted by arrow A1. The soldering iron tip can also be moved out of the open space through any of the gaps, as depicted by arrows A2 and A3.

Figure 7:
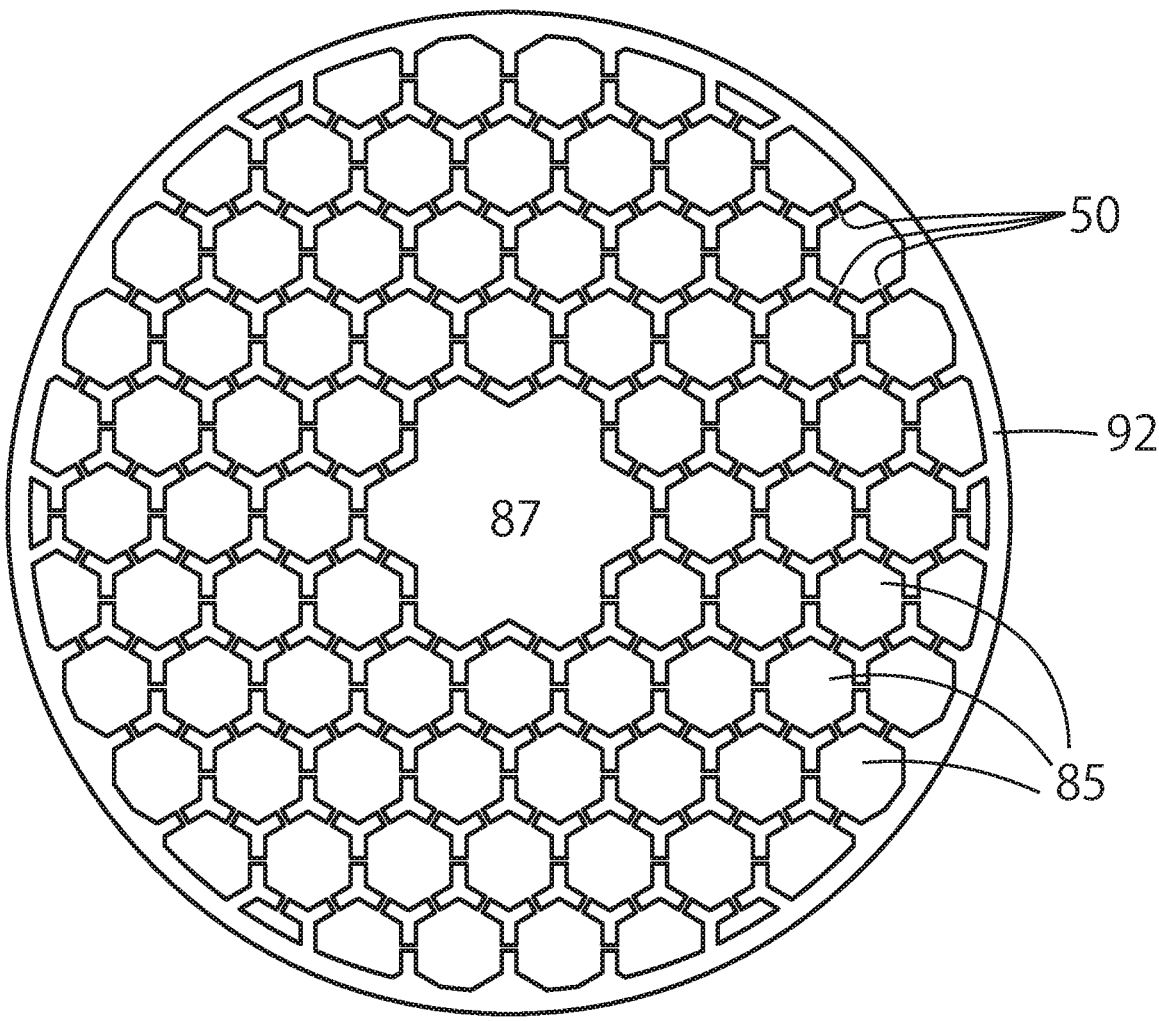
FIG. 7 is a top view of the cleaning pad showing the design of the groups of six projections of FIG. 6 covering most of the surface of the base of the cleaning pad.

FIG. 7 depicts another top view of the entire cleaning pad 20 having a honeycomb pattern of interconnected hexagonal grouped projections 24. FIG. 7 depicts circular cleaning pad 20. The gaps 50 between the respective projections 70, 72, 74, 76, 78 and 80 can open in the various directions. This means that solder is removed from the soldering iron with movement of the soldering iron in various direction on the cleaning pad 20, and the solder is gathered and contained within the open spaces 85 defined by the respective hexagons. The user can place the cleaning pad 20 is any convenient location without paying attention to the direction or orientation of the cleaning pad 20. This circular cleaning pad 20 has the base 22, honeycomb structure 90, and a peripheral wall 92.

The base 22 and projections 24 may be formed from a heat resistant and bendable or resilient material. Examples of the materials for forming the cleaning pad 20 may include silicon rubber, elastomeric resin and brass or brass alloy. Alternatively, the base 22 and the projections 24 may be formed of different materials. For example, the base 22 may be formed from silicon rubber, elastomeric resin or a high temperature polymer, while the projections 24 are formed from brass, a brass alloy or aluminum alloy.

The honeycomb structure depicted in the top view of FIG. 7 includes the hexagonal projection groups which form many open spaces 85. The projections 24 are predominantly Y-shaped. The configuration of the honeycomb has an open space in the center that forms a large opening 87. Preferably, the soldering iron tip may be inserted near the center of the cleaning pad 20 into the large opening 87 and then moved outward through the hexagonal groups of projections toward the peripheral wall 92. Thereby solder is easily stored in the open spaces 85 or the center large opening 87. It may be desirable for the cleaning pad 20 to have a wider storage space in the center, or alternatively the cleaning pad 20 may be filled with the hexagonal groups of projections and have only the small open spaces 85.

As depicted in FIG. 7, the peripheral wall 92 may be formed from the same material as the base 22 of the cleaning pad 20. Alternatively, the rigidity of the peripheral wall may be greater than that of the projections 24, and the peripheral wall may be formed of alternate materials, including for example brass alloys or aluminum alloys. The peripheral wall 92 preferably has a height equal to the height of at least some the projections 24, and the peripheral wall 92 may be thicker than the projections 24. The peripheral wall 92 restrains deformation of the base 22 while the solder is being removed. Therefore, solder is effectively removed from the soldering iron.

Figure 8:
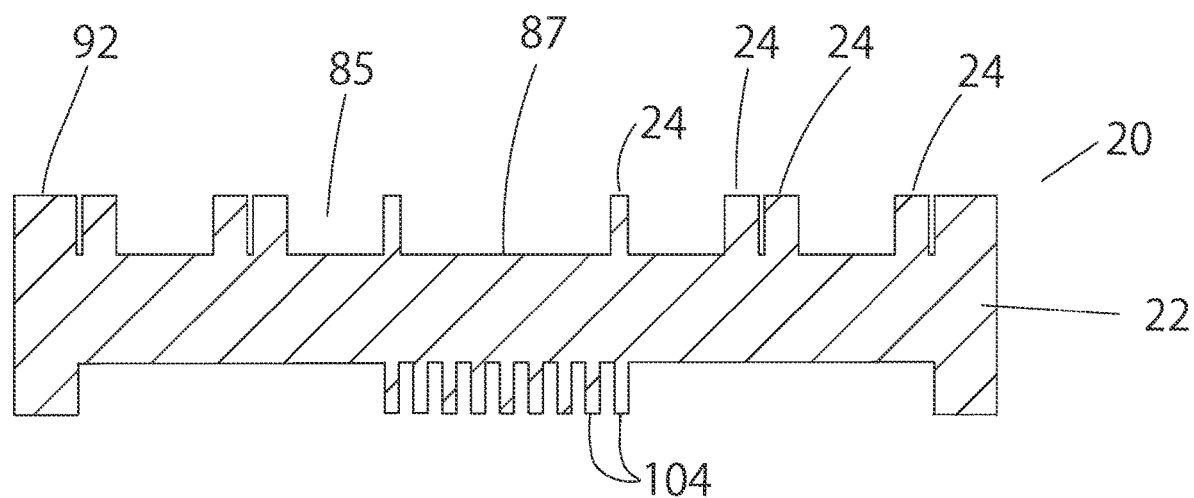
FIG. 8 is a side cross sectional view of a reversible cleaning pad according to the present invention.

FIG. 8 depicts a cross sectional view of the cleaning pad 20 having the configuration of the hexagonal projections of FIG. 7 on the top surface, and a reversible opposite side having a different configuration for the cleaning structure and projections. A depicted in FIG. 8, the projections 24 on the top side of the cleaning pad 20 extend upward a uniform distance, i.e. they have a uniform height. Preferably, the height of the projections is at least four times the minimum thickness at the base of each respective projection 24. However, as depicted in FIG. 1, the height of the projections may alternatively be uneven and the projections may have a height up to the diameter of the entire base 22 of the cleaning pad 20.

Figure 9:
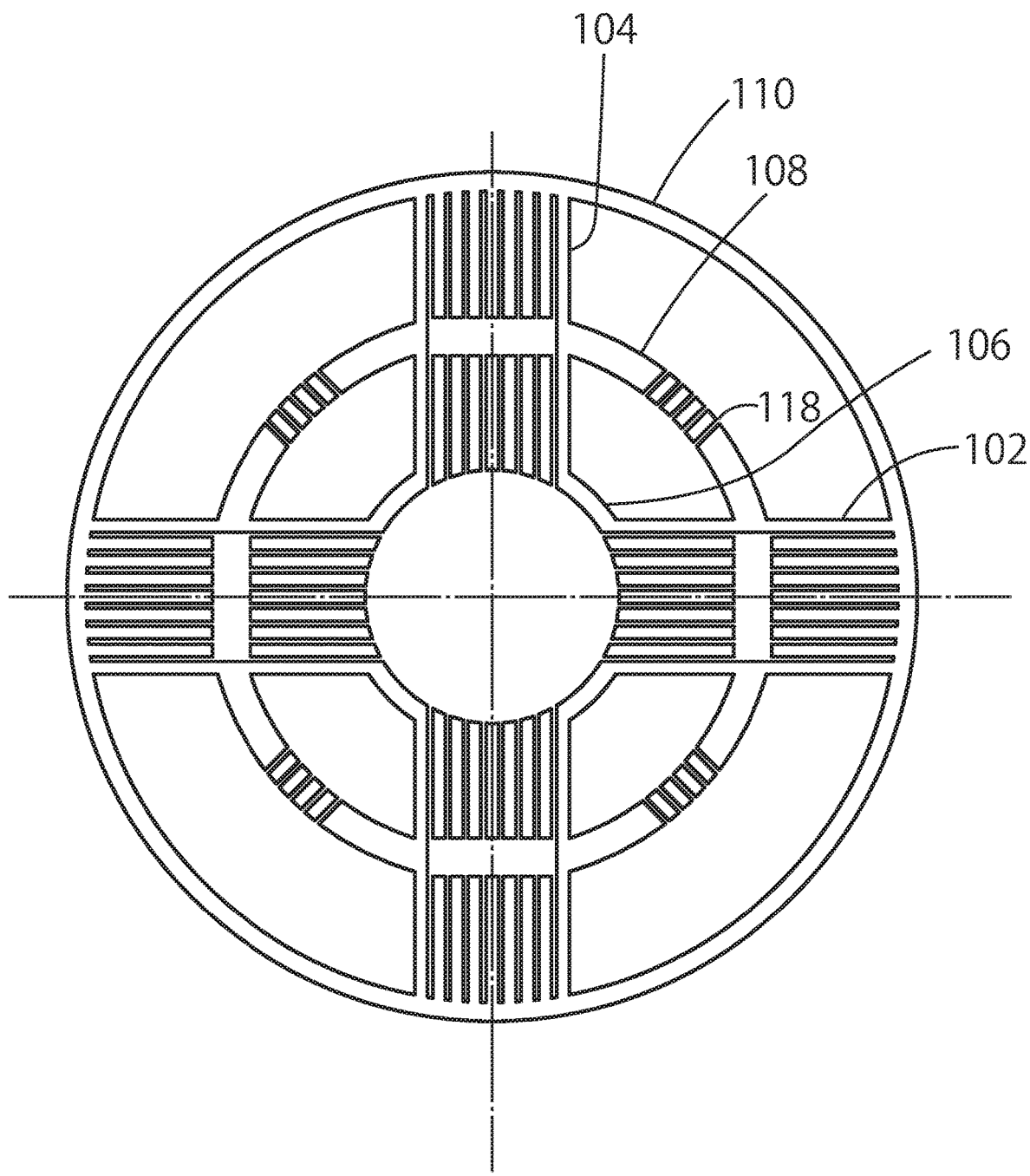
FIG. 9 is a bottom view of the reversible cleaning pad of FIG. 7.

The bottom surface of the cleaning pad 20 of FIG. 8 may have a design for the projections which is different from that of the upper surface, and the cleaning pad 20 may be reversible. FIG. 9 depicts a bottom view of one example of a cleaning design configuration 100. The design includes projections in the form of a plurality of horizontal ribs 102, vertical ribs 104, an inner annular rib (or ribs) 106, a middle annular rib (or ribs) 108 and an outer annular rib 110 projecting from the base 22. The tip of the soldering iron may be inserted into the gap of horizontal ribs 102 or the vertical ribs 104 and then the soldering iron may then be moved horizontally or vertically across the cleaning pad 20. The solder of the tip is caught by the respective ribs and removed from the soldering iron. The configuration may also include slots 118 through the middle annular ribs 108 which are shifted at a forty five degree angle from the horizontal ribs 102 and the vertical ribs 104. The solder can also be removed using the middle annular ribs. Solder is removed from the soldering iron with movement of the soldering iron in various directions on the cleaning pad 20 in a manner similar to that discussed above with respect to the honeycomb structure.

The cleaning pad 20 depicted in FIGS. 1-7 may have a variety of axial cross sectional shapes defined by the projections 24, as shown in the partial top views of FIGS. 10-18. The shapes for the projections depicted in FIGS. 1-7 and FIGS. 10-18 may be combined in any manner or combination on the base 22 of a single cleaning pad 20.

Figure 10:
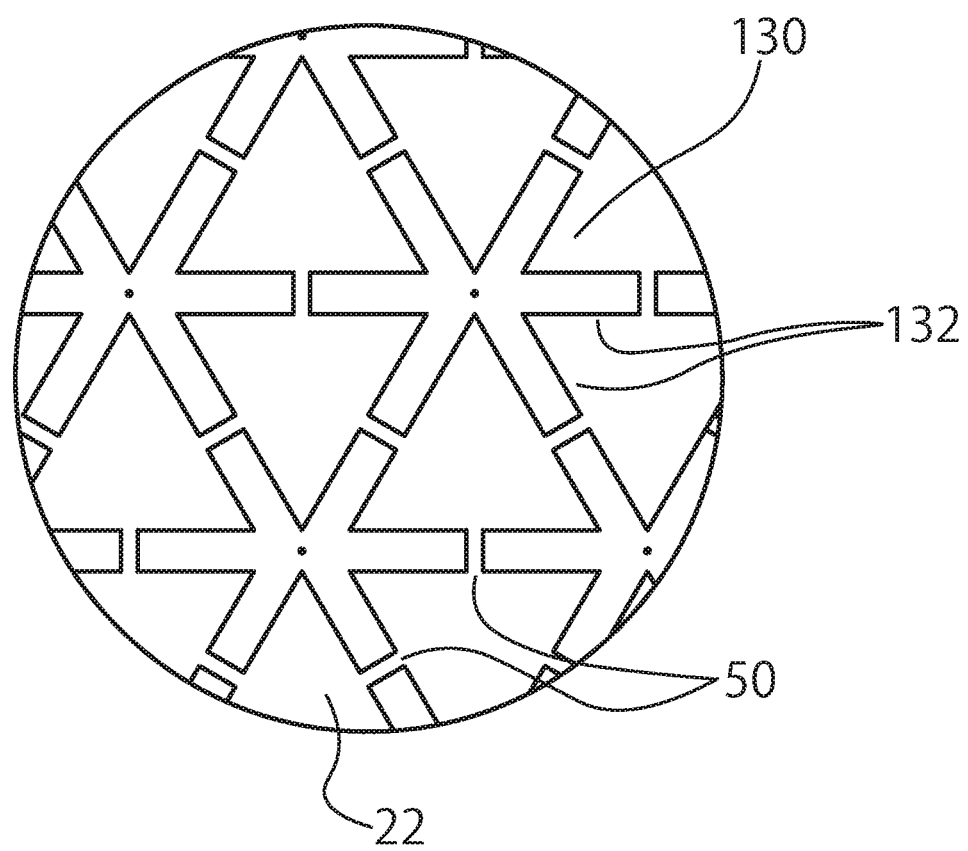
FIG. 10 is a top, partial view of the cleaning pad showing the design another alternate shape for the projections.

As depicted in the partial top view of the projections 24 of FIG. 10, the plural projections 130 have six walls 132 radially extending from the center forming an asterisk shape. Three neighboring projections 130 form the open space 85. There are gaps 50 between respective projections 130. Inserting the soldering iron into the gaps 50 and moving the soldering iron across the cleaning pad 20 allows the solder to be caught by the walls 132 and stored in the open spaces 85.

Figure 11:
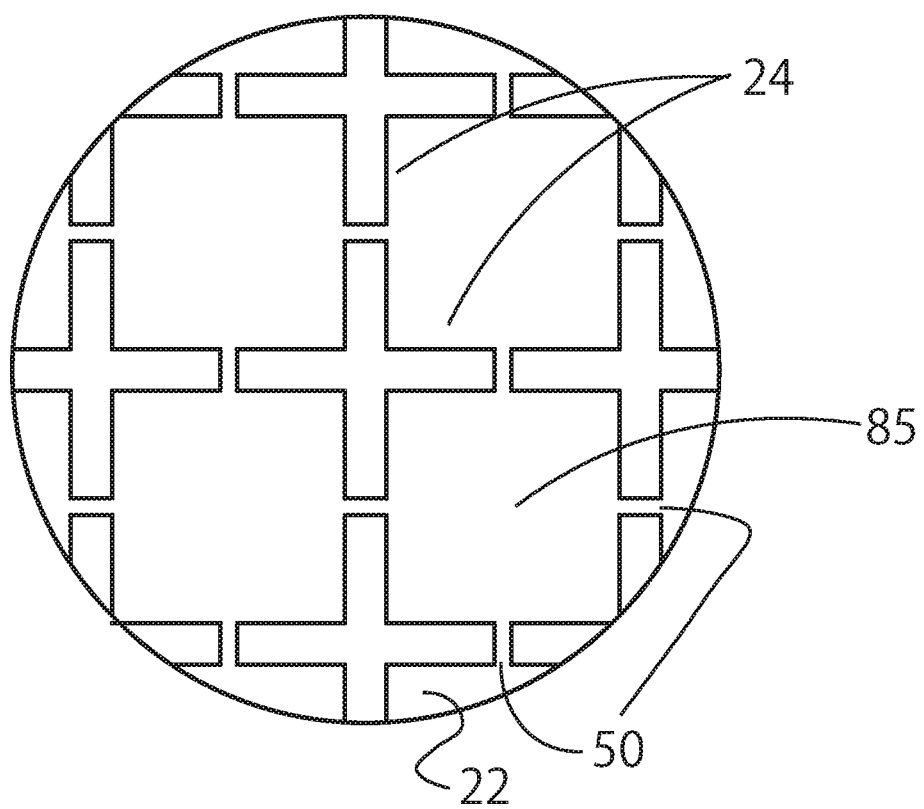
FIG. 11 is a top, partial view of the cleaning pad showing the design another alternate shape for the projections.
Figure 12:
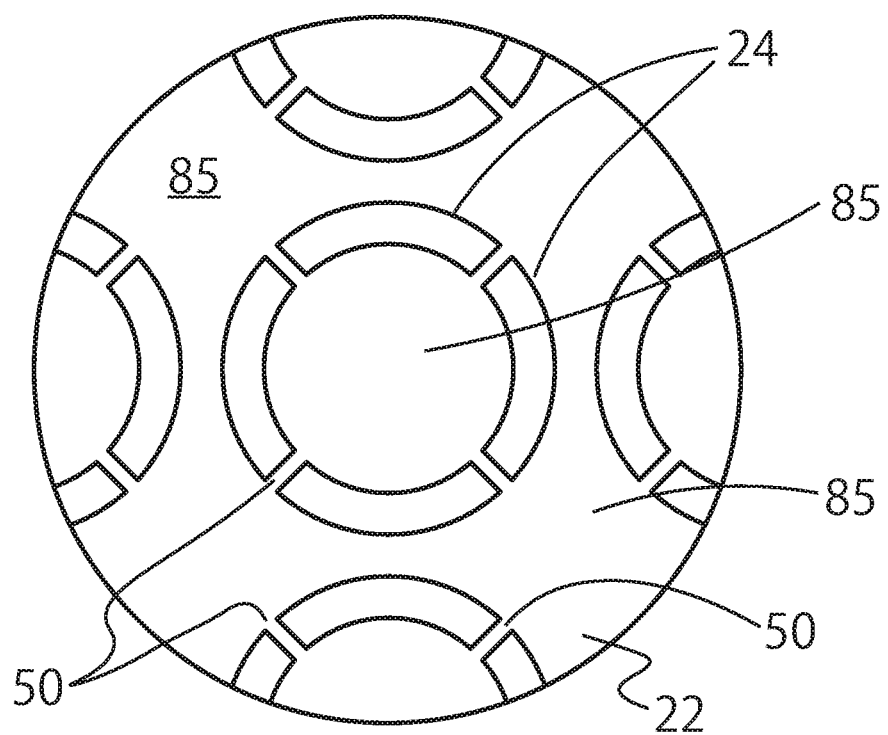
FIG. 12 is a top, partial view of the cleaning pad showing the design another alternate shape for the projections.
Figure 13:
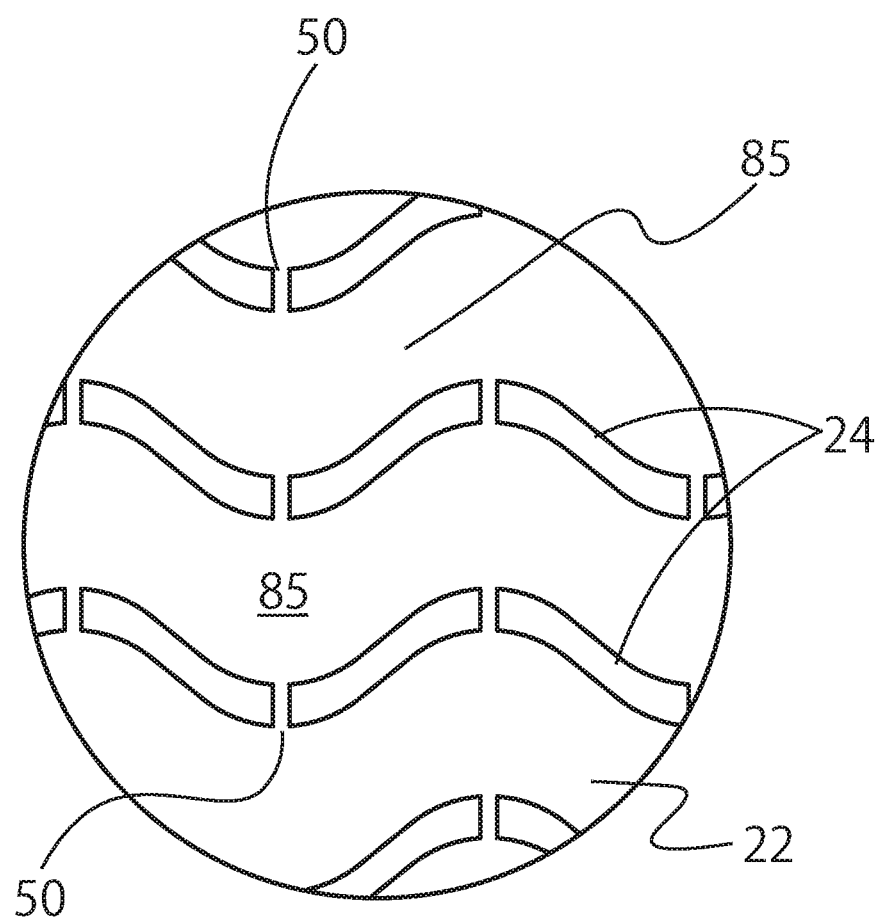
FIG. 13 is a top, partial view of the cleaning pad showing the design another alternate shape for the projections.
Figure 14:
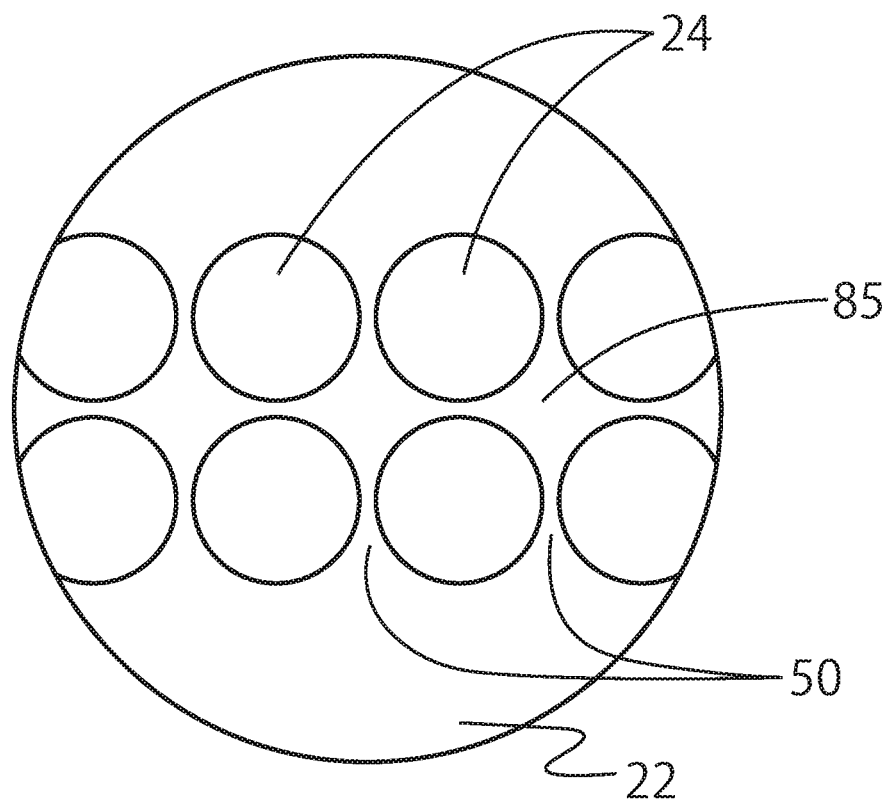
FIG. 14 is a top, partial view of the cleaning pad showing the design another alternate shape for the projections.
Figure 15:
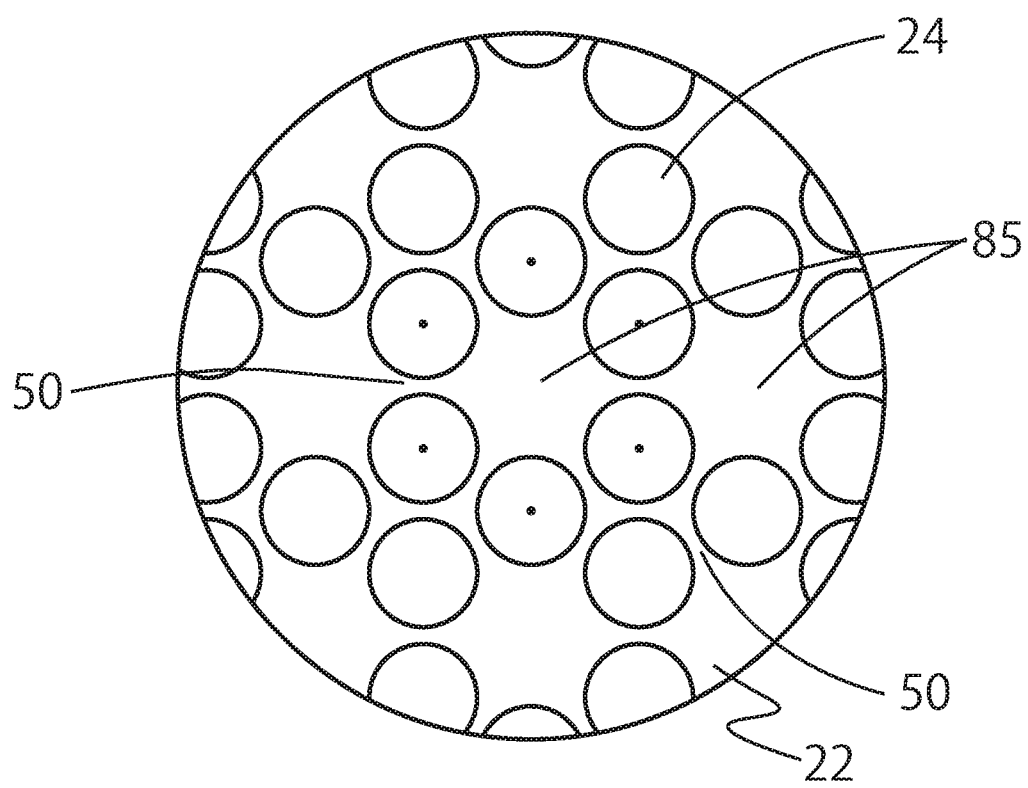
FIG. 15 is a top, partial view of the cleaning pad showing the design another alternate shape for the projections.
Figure 16:
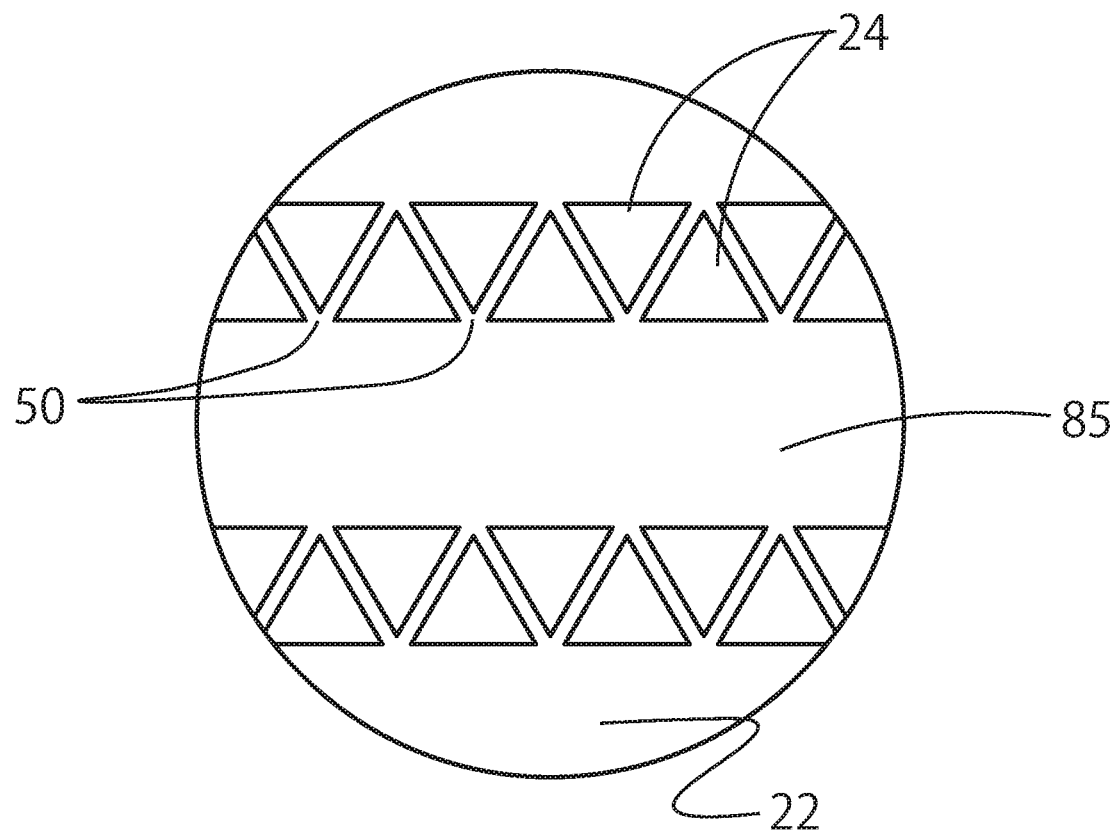
FIG. 16 is a top, partial view of the cleaning pad showing the design another alternate shape for the projections.
Figure 17:
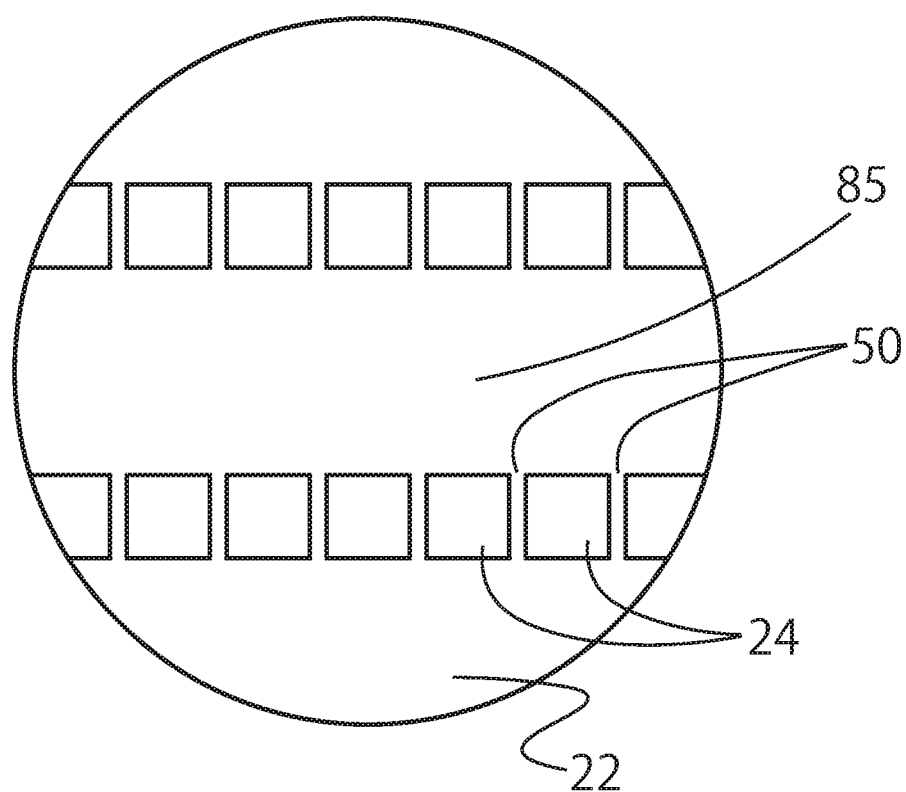
FIG. 17 is a top, partial view of the cleaning pad showing the design another alternate shape for the projections.
Figure 18:
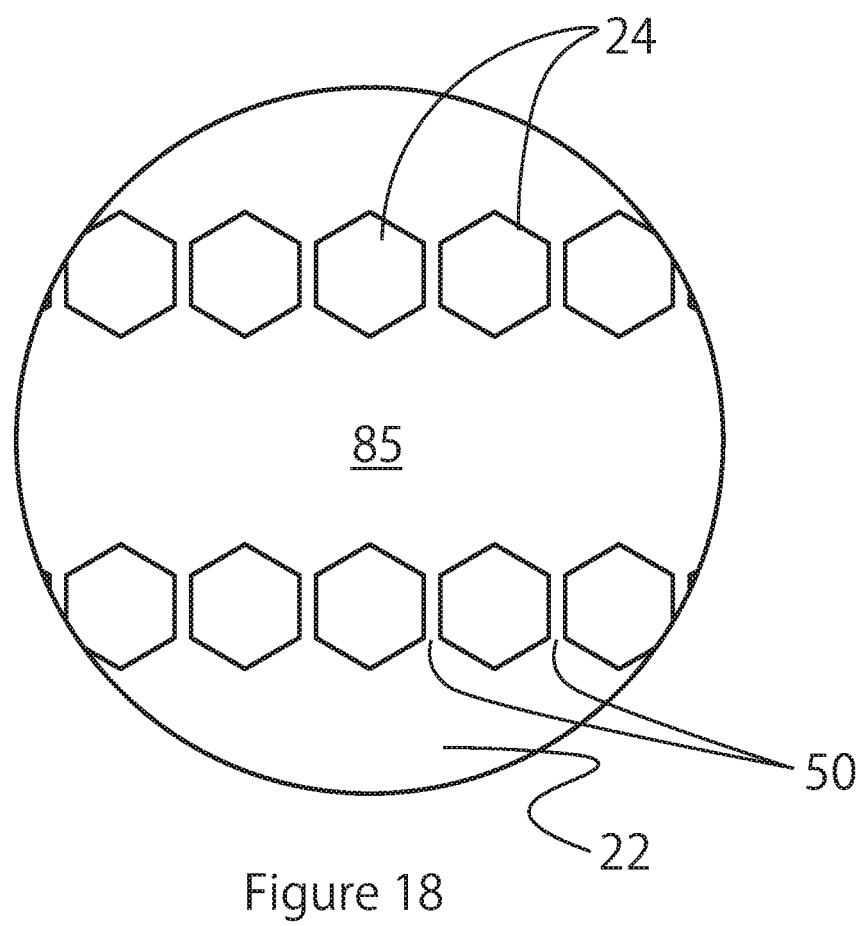
FIG. 18 is a top, partial view of the cleaning pad showing the design another alternate shape for the projections.

FIGS. 11 to 18 depict alternative partial top views of configurations for the projections 24. In FIG. 11, the projections 24 are in the shape of a cross or plus sign. Four neighboring projections 24 form the open space 85. In FIG. 12, the projections 24 are arc-shaped and spaced apart by gaps 50 to form circles, the centers of which define the open spaces 85. Four neighboring arc-shaped projections form an alternate open space 85. In FIG. 13, the projections 24 are elongated "S" shaped. Aligned S-shaped projections appear to form a wave line with gaps 50 between respective projections 24. Solder may be accumulated in the open space 85 between respective rows of projections 24. In FIG. 14, the projections 24 are columns arranged in parallel rows. Solder is stored in the open spaces 85 formed by four neighboring column projections 24. In FIG. 15, the projections 24 are similarly depicted as columns. However, instead of being formed in parallel rows, each set of six projections 24 are arranged in a hexagon shape with a central void that defines the open space 85. In FIG. 16, the projections 24 are triangle prism columns, with adjacent triangles oppositely disposed to define a row with narrow gaps 50 between respective columns 24. The respective rows are spaced apart and aligned to define the open space 85 for collecting the removed solder. In FIG. 17, the projections 24 are square prisms arranged side by side with narrow gaps 50 and in parallel rows to define an open space 85. In FIG. 18, the projections 24 are hexagonal prisms arranged side by side with narrow gaps 50 and in parallel rows to define an open space 85.

Figure 19:
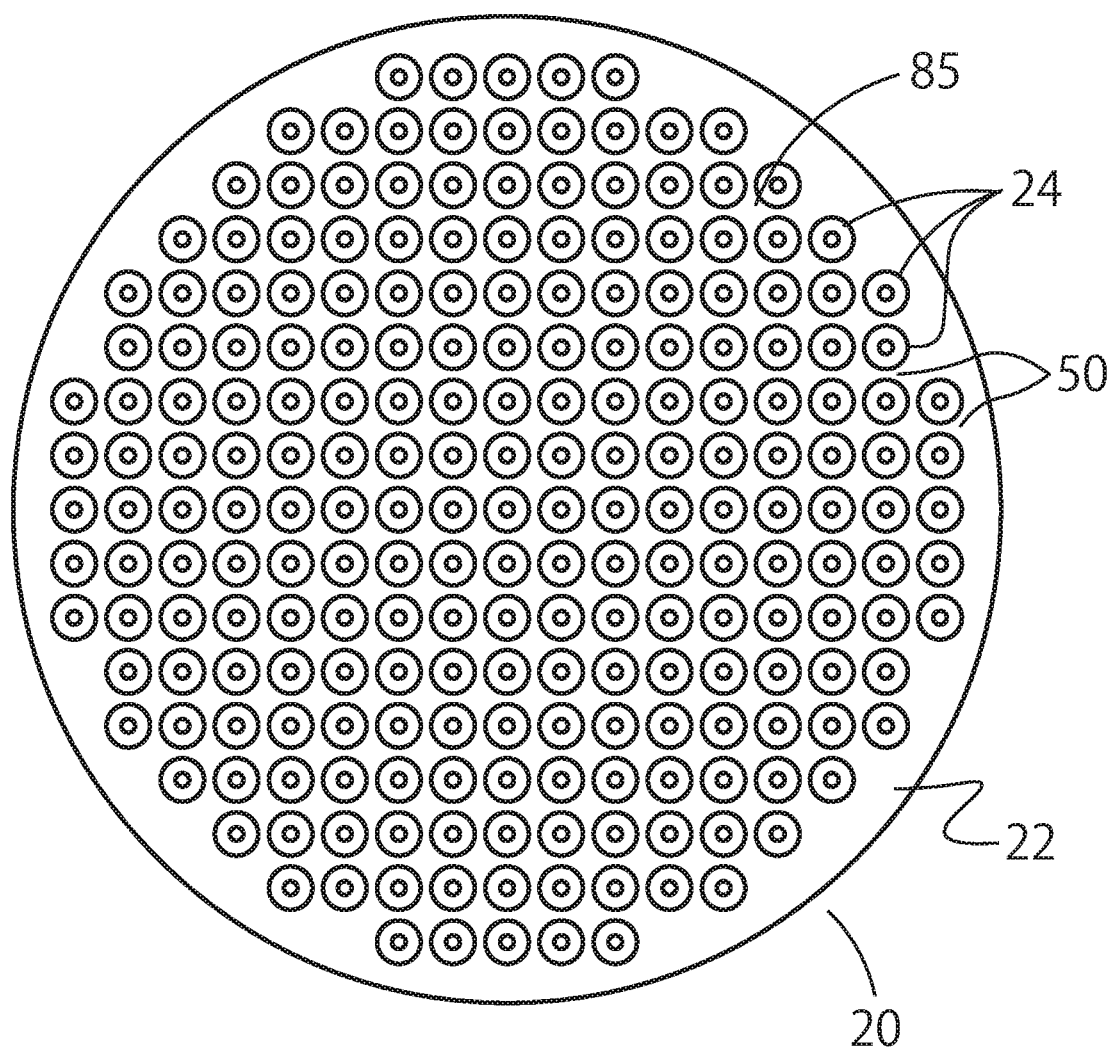
FIG. 19 is a top view of an embodiment of the invention having truncated cone projections.
Figure 20:
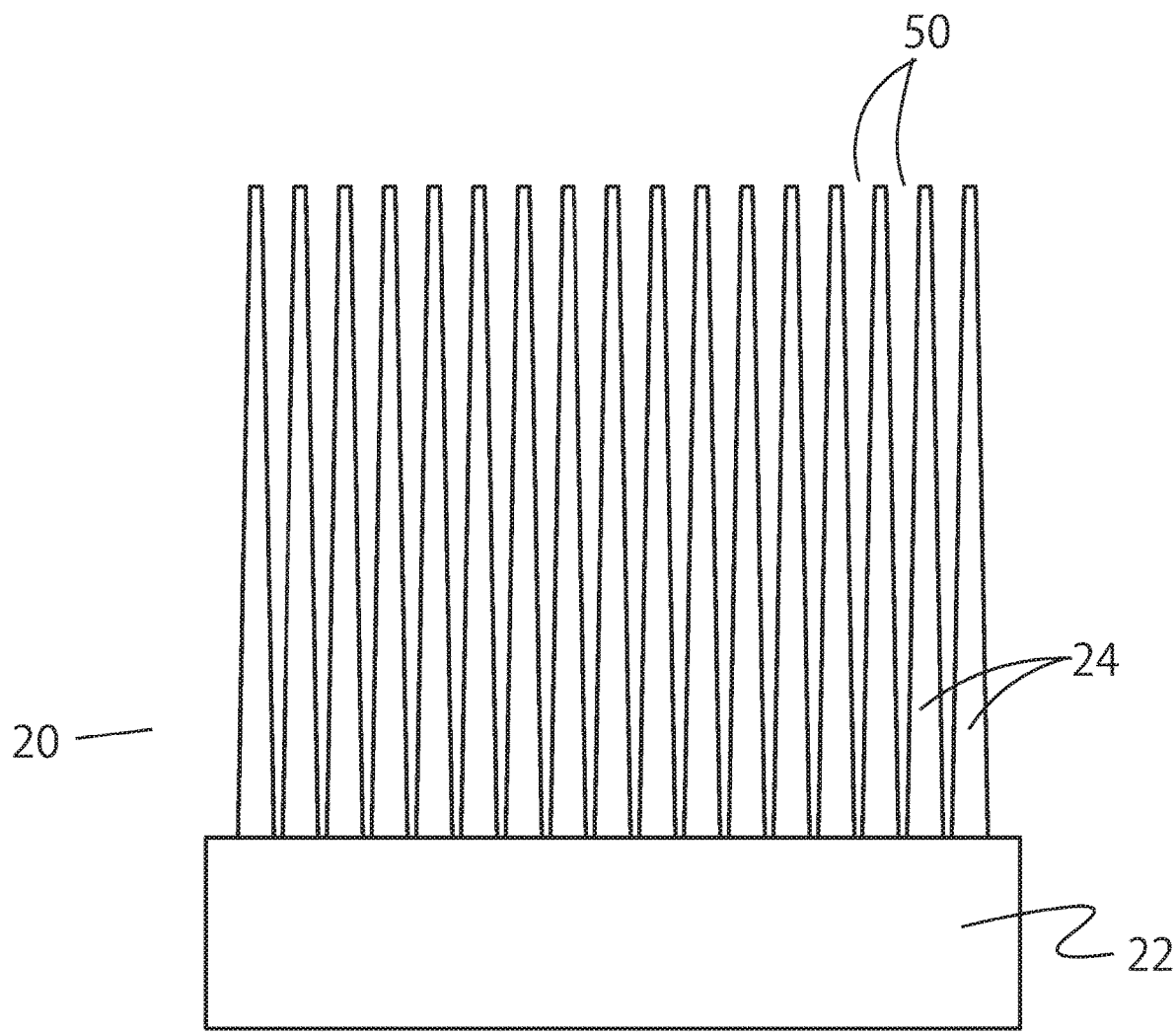
FIG. 20 is a side view of the embodiment of the invention depicted in FIG. 19.

FIGS. 19 and 20 show top views and side views respectively of a cleaning pad 20 having cone shaped projections 24, arranged in parallel rows to define open spaces 85 as discussed above with respect to FIG. 14, with all of the projections 24 having a similar height as shown in the side view of FIG. 20.

For any of the foregoing configurations, the height of projections 24 may be substantially greater that than the diameter at the base of the projection 24, as depicted in FIG. 20. The gaps 50 between adjacent projections 24 preferably have a width of 0.1 mm to 1.5 mm. When long projections 24 are crowded on the cleaning pad 20, solder on the tool to be cleaned will contact the outer surfaces of the projections 24 and will be removed from the soldering iron efficiently. The projections 24 around the soldering iron prevent solder from scattering or splashing on the work area and the user. The projections 24 may have a constant thickness or they may be truncated. Additionally, the projections 24 may have any of the following shapes: cone, column, pyramid, rectangular column or elliptic cylinder. Preferably, the height of each projection 24 is greater than the diameter or thickness at its base end. The materials used to form the cleaning pad 20 may be high temperature resins and elastomeric polymers. Alternatively, the cleaning pad 20 may be formed from metal, such as brass, brass alloys and aluminum alloys. The height of the projections 24 is preferably greater that the diameter or thickness at the base so that projections 24 may bend easily when the soldering iron touches the projections 24. In rigid projections 24 formed from brass, brass alloys or aluminum alloys may be secured to a silicon rubber, resin or polymer base so that the base allows the projections to be pushed from the vertical orientation by the soldering iron, while the base provides the resiliency to return the projection to the vertical orientation. When the soldering iron is inserted into and drawn through the gaps 50 between the projections 24, the large area of the soldering iron can be touched by and deform or bend a number of projections 24. When the projections 24 return to their original state, solder removed from the soldering iron is retained in the gaps 50 and the open spaces 85. Removed solder may adhere to the projections 24 as the soldering iron is swept across the cleaning pad 20 so that the removed solder is not scattered to the work area. The solder in the gaps 50 and open spaces 85 may be removed by inverting the cleaning pad 20 and rubbing the projections 24.

The invention has been described in detail above in connection with the figures, and it will be understood that various combinations of shapes for the projections 24 may be included on a single base 22. Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:

1. A cleaning pad assembly for use in cleaning bonding material from a solder tool, the cleaning pad assembly comprising:

a solder tool cleaning pad having a base and a plurality of bendable projections extending upward from said base, said bendable projections formed to define an obtuse angle cross-section when viewed parallel to the base and arranged to provide gaps between opposing edges of said bendable projections for removing solder from said solder tool and said obtuse angle shaped projections arranged to have end faces of said opposing edges aligned and spaced in a pattern to form a plurality of open spaces defined by at least four of said bendable projections to accumulate bonding material cleaned from said solder tool in said open spaces.

2. The cleaning pad assembly of claim 1, wherein said cleaning pad assembly further includes a peripheral wall having a rigidity greater than the rigidity of said bendable projections, and said peripheral wall projecting from a rim of said base.

3. The cleaning pad assembly of claim 2, wherein said bendable projections have a height greater than a thickness of the bendable projection at a point of contact with said base and said gaps 0.1 mm to 1.5 mm wide between opposing edges of said bendable projections.

4. The cleaning pad assembly of claim 1, wherein said cleaning pad is formed from high temperature resins, silicon rubber or elastomeric polymer.

5. The cleaning pad assembly of claim 1, wherein said cleaning pad is reversible and said base of said cleaning pad has an underside having an array of projections in a non-hexagonal pattern different from a hexagonal array pattern of said projections configured in groups of six on an upper-side of said base.

6. The cleaning pad assembly of claim 1, wherein said projections are configured in groups of six to form a hexagon.

7. A cleaning pad assembly for use in cleaning bonding material from a solder tool, the cleaning pad assembly comprising:

a solder tool cleaning pad having a base and a plurality of bendable projections extending upward from said base, said bendable projections formed to have a "Y" cross-sectional shape cross-section when viewed parallel to the base with gaps between opposing and aligned tip ends of said "Y" shaped projections for removing solder bonding material from said solder tool and said "Y" shaped projections forming a plurality of hexagonal open spaces for accumulating bonding material.

8. The cleaning pad assembly of claim 7, wherein said cleaning pad assembly further includes a peripheral wall having a rigidity greater than the rigidity of said bendable projections, and said peripheral wall projecting from a rim of said base.

9. The cleaning pad assembly of claim 8, wherein said bendable projections have a height greater than a thickness of the bendable projection at a point of contact with said base and said gaps 0.1 mm to 1.5 mm wide between opposing and aligned tip ends of said "Y" shaped bendable projections.

10. The cleaning pad assembly of claim 7, wherein said cleaning pad is formed from high temperature resins, silicon rubber or elastomeric polymer.

11. The cleaning pad assembly of claim 7, wherein said cleaning pad is reversible and said base of said cleaning pad has an underside having an array of projections in a pattern different from an array pattern of the projections on an upper-side of said base, wherein said array pattern on said upper side comprises projections arranged in groups of six.

12. The cleaning pad assembly of claim 7, wherein said projections are configured in groups of six to form hexagons within a honeycomb pattern with 0.1 mm to 1.5 mm wide gaps between opposing tip ends of said "Y" shaped projections.

13. A cleaning pad assembly for use in cleaning bonding material from a solder tool, the cleaning pad assembly comprising:

a solder tool cleaning pad having a base and a plurality of bendable projections extending upward from said base, each of said bendable projections formed as angled projections to have obtuse angle cross-section shapes when viewed parallel to the base, clustered to define 0.1 mm to 1.5 mm wide gaps between adjacent aligned edges of said angled projections for removing solder bonding material from said solder tool and an open space encircled by said bendable projections to accumulate solder bonding material in said open spaces, wherein said cleaning pad is reversible and said base of said cleaning pad has an underside having an array of projections in a pattern different from an array pattern of the projections on an upper-side of said base.

* * * * *